(No Model.)
R. L. SHORT.
HORSE HAY FORK.
No. 312,026. Patented Feb. 10, 1885.
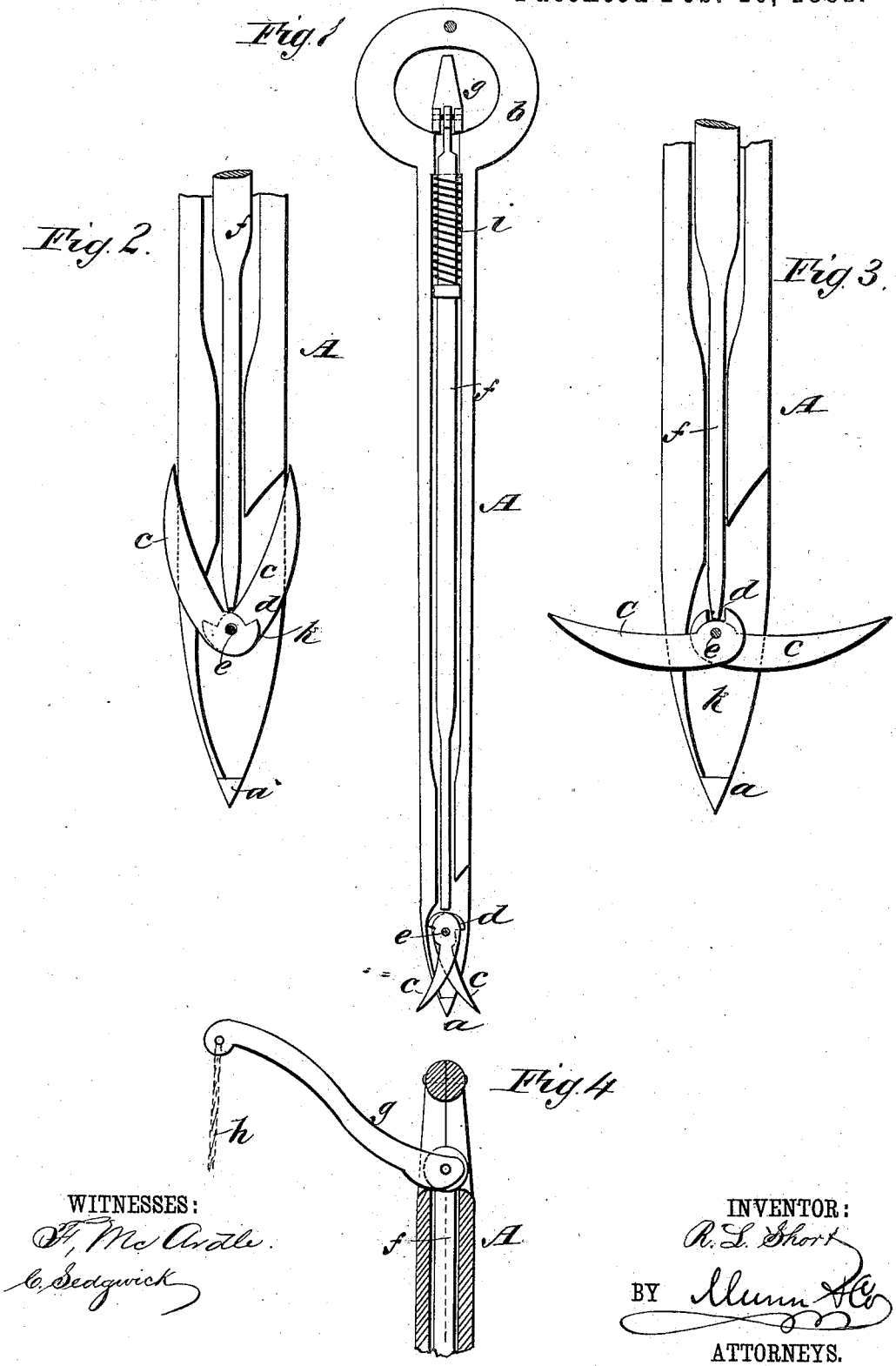
WITNESSES:
F. McArdle
C. Sedgwick
INVENTOR:
R. L. Short
BY Munn & Co
ATTORNEYS.

UNITED STATES PATENT OFFICE.

ROBERT L. SHORT, OF JANESVILLE, WISCONSIN, ASSIGNOR TO THE NEW DOTY MANUFACTURING COMPANY, OF SAME PLACE.

HORSE HAY-FORK.

SPECIFICATION forming part of Letters Patent No. 312,026, dated February 10, 1885.

Application filed July 16, 1884. (No model.)

*To all whom it may concern:*

Be it known that I, ROBERT L. SHORT, of Janesville, in the county of Rock and State of Wisconsin, have invented a new and useful Improvement in Hay-Forks, of which the following is a full, clear, and exact description.

This invention relates to improvements in forks for elevating hay; and it consists of the combination of the parts and their construction, substantially as hereinafter described and claimed.

Reference is to be had to the accompanying drawings, forming a part of this specification, in which similar letters of reference indicate corresponding parts in all the figures.

Figure 1 is a sectional elevation of the improved fork with the teeth in position for entering the hay. Fig. 2 is a section showing the teeth in the position they assume after the fork enters. Fig. 3 is a similar view showing the teeth as projected to raise the hay; and Fig. 4 is a detail section showing the trip-lever.

The shank or body A is of tubular form, made with a pointed end, $a$, for penetrating the hay, and with a ring, $b$, at the other end for hoisting the fork. $c\ c$ are the teeth, which, as shown, are tapering and pointed, with their butt-ends rounded and provided with shoulders $d$. These teeth are pivoted in the end of shank A by a cross-pin, $e$, and the shank is slotted at $k$ to allow the teeth to describe nearly a half-circle in their movement. In the hollow shank is a trip-rod, $f$, resting at its lower end on the teeth and extending at its upper end through the under side of ring $b$. A lever, $g$, is pivoted to the upper end of the rod and rests on the bottom of the ring, the outer end having a cord, $h$, attached to move the lever and raise the rod. A spring, $i$, around rod $f$, pressing against the under side of the ring $b$, serves to force the rod downward. The teeth $c$ assume the position shown in Fig. 1 by gravity, and while in that position the fork is forced down into the hay, the resistance of the hay raising the teeth and carrying them to the position shown in Fig. 2. The fork being then lifted, the hay catches the teeth-points and carries them outward to the horizontal position, where they are stopped and held by engagement of rod $f$ with shoulders $d$. By raising the trip-rod the teeth are released, and falling drop their load, and the fork is ready to enter the hay again.

I am aware that it is old to employ a tripping-rod to which the tines are connected and which actuates the tines, and to employ a tripping-rod having a slotted lower end within which slot the upper ends of the tines lie, the lower edge of said slot being formed of a tapered cross-bar, which effects the spreading of the tines, while the upper edge of said slot is formed of a wedge-shaped bar, which aids in spreading the tines.

Having thus described my invention, I claim as new and desire to secure by Letters Patent—

In a hay-fork, the combination, with the slotted shank and the tripping-rod, of the pivoted tines having at their inner ends shoulders to form a socket as said tines are extended to receive the lower end of said tripping-rod, said tines adapted to enter the material points downward and to be reversed by the action of the material as the fork enters the same and to be extended by the material as the fork is withdrawn, substantially as described.

ROBERT L. SHORT.

Witnesses:
J. J. R. PEASE,
F. C. GRANT.